US008723962B2

(12) United States Patent  
Herring et al.

(10) Patent No.: US 8,723,962 B2  
(45) Date of Patent: May 13, 2014

(54) CAMERA BASED INFORMATION EXCHANGE MECHANISM

(75) Inventors: Dean F. Herring, Youngsville, NC (US); Brad M. Johnson, Raleigh, NC (US); Adrian X. Rodriguez, Durham, NC (US); Jeffrey J. Smith, Raleigh, NC (US); David J. Steiner, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 139 days.

(21) Appl. No.: 13/324,125

(22) Filed: Dec. 13, 2011

(65) Prior Publication Data

US 2013/0147970 A1   Jun. 13, 2013

(51) Int. Cl.
*H04N 5/225*   (2006.01)
*G06Q 30/00*   (2012.01)

(52) U.S. Cl.
USPC ...................................... 348/207.1; 705/26.4

(58) Field of Classification Search
USPC .......... 348/207.1; 705/16, 14.1, 14.13, 14.27, 705/14.38, 26.4
See application file for complete search history.

(56) References Cited

U.S. PATENT DOCUMENTS

| | | | |
|---|---|---|---|
| 5,634,144 A | 5/1997 | Mauro et al. | |
| 5,768,633 A | 6/1998 | Allen et al. | |
| 2007/0145147 A1* | 6/2007 | Schmidt et al. | 235/462.46 |
| 2011/0143811 A1* | 6/2011 | Rodriguez | 455/556.1 |
| 2011/0145093 A1* | 6/2011 | Paradise et al. | 705/26.41 |
| 2012/0109773 A1* | 5/2012 | Sipper et al. | 705/26.3 |
| 2012/0330743 A1* | 12/2012 | Schul et al. | 705/14.38 |
| 2013/0066733 A1* | 3/2013 | Levy et al. | 705/16 |

OTHER PUBLICATIONS

"Get more out of AR with Layar Vision", Layar, http://www.layar.com, accessed on Dec. 7, 2011, 1 page.
"Google Goggles", Google, http://www.google.com/mobile/goggles/#text, accessed on Dec. 7, 2011, 2 pages.

* cited by examiner

*Primary Examiner* — Tuan Ho
*Assistant Examiner* — Shahbaz Nazrul
(74) *Attorney, Agent, or Firm* — Stephen J. Walder, Jr.; Thomas E. Tyson

(57) ABSTRACT

Mechanisms, in a portable computing device comprising a camera, for exchanging information between a user and a provider are provided. With these mechanisms, an image is captured using the camera of the portable computing device and an identifier of a physical object associated with the captured image is determined. The portable computing device transmits the identifier of the physical object, and user information describing a user of the portable computing device, to a separate computing device associated with a provider of the physical object. The portable computing device receives information associated with the physical object from the separate computing device associated with the provider of the physical object. A storage device of the portable computing device stores the physical object information in association with at least one of the captured image or the identifier of the physical object.

23 Claims, 4 Drawing Sheets

CAMERA BASED INFORMATION EXCHANGE MECHANISM

BACKGROUND

The present application relates generally to an improved data processing apparatus and method and more specifically to mechanisms for exchanging information using a camera based system and method.

Recently, providers of services and products have begun using mechanisms that allow a user of a camera device to obtain information about their products by using the camera device to take a picture of a unique tag associated with their product or service. One example of such a mechanism is the use of Quick Response (QR) tags and QR reader applications executed on a mobile communication device equipped with a camera. With QR tags and QR readers, the QR tag has a unique configuration of blocks that identifies a particular service or product. When the user of a mobile device executes the QR reader application on the user's mobile communication device, the camera on the mobile communication device is activated and the user may place the QR tag within a detection area of the camera. In response to the user holding the mobile communication device in a position where the QR tag is detectable by the camera and the QR reader application, the QR reader application processes the pattern of blocks from the QR tag, contacts a remote server computing device via wireless communication, such as by using a Uniform Resource Locator (URL) or the like, and retrieves information about the service or product which may then be displayed on a display of the mobile communication device.

A similar mechanism is provided with bar code reader applications. With such applications, the bar code on a product may be placed within a detection area of a camera's view so that the bar code reader application detects the bar code. The bar code reader application then correlates the bar code with product/service information by contacting a server computing device, such as via the Internet or the like, and retrieves the product/service information for display on the display of the mobile communication device.

SUMMARY

In one illustrative embodiment, a method, in a portable computing device comprising a camera, for exchanging information between a user and a provider. The method comprises capturing an image using the camera of the portable computing device and determining an identifier of a physical object associated with the captured image. The method further comprises transmitting, by the portable computing device, the identifier of the physical object, and user information describing a user of the portable computing device, to a separate computing device associated with a provider of the physical object. Moreover, the method comprises receiving, by the portable computing device, information associated with the physical object from the separate computing device associated with the provider of the physical object. The method also comprises storing, in a storage device of the portable computing device, the physical object information in association with at least one of the captured image or the identifier of the physical object.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
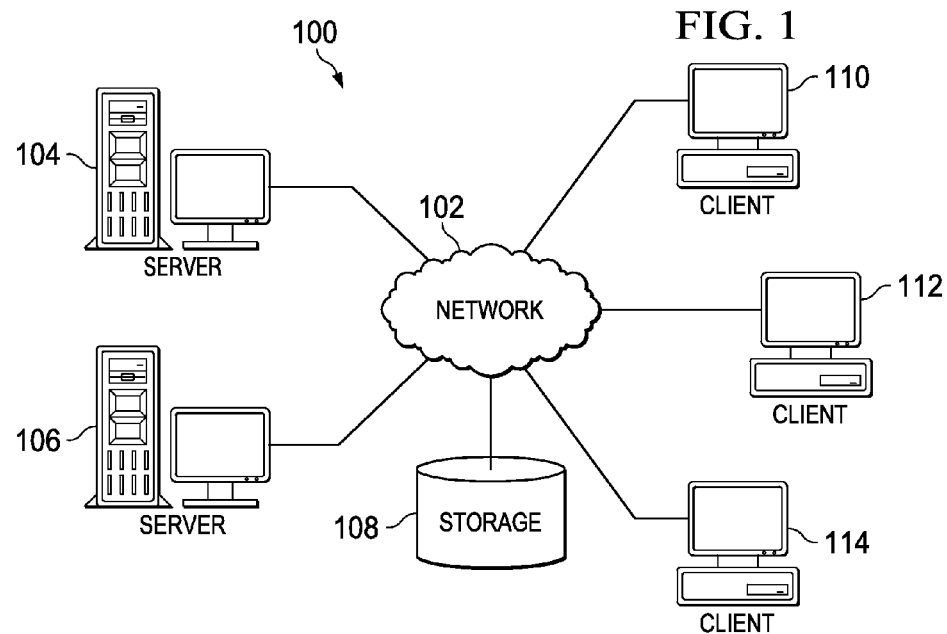
FIG. 1 is an example diagram of a distributed data processing system in which aspects of the illustrative embodiments may be implemented.

While Quick Response (QR) readers, bar code readers, and the like, provide a mechanism by which a user of a mobile communication device equipped with a camera can easily obtain further information about a product or service, the exchange of information with such mechanisms is a one-way exchange. That is, the user of the mobile communication device is able to obtain information about the product/service associated with the particular QR tag or bar code, however there is no automated mechanism for the provider of the product/service to obtain information about the user of the mobile communication device. As a result, an opportunity for providers of products/services to obtain information about their potential customers, persons showing an interest in the products/services, and the like, is lost.

The illustrative embodiments provide a mechanism for a two-way exchange of information using a camera based system to detect identifiers of products/services. With the mechanisms of the illustrative embodiments, a user of a camera enabled computing device establishes a set of information that the user is willing to exchange with providers of products/services in a profile of the user on the camera enabled computing device. The information selected is information about the user that the user is willing to transmit to an external computing device in exchange for information about products/services that the user may wish to acquire. The selected information about the user may be compiled into a cookie-type data object, or other small size data object, that is stored on the camera enabled computing device.

In response to a user utilizing the camera of the computing device to take a photograph or otherwise detect an identifier of a product/service, e.g., a QR tag, a bar code, or the like, the camera enabled computing device transmits the cookie-type data object to an external computing device associated with the QR tag, bar code, or the like. This external computing device may be local to the user's current position, such as in the case of a server computing device within a store or business establishment, or may be a remotely located computing device, such as a server computing device accessible by way of a wired and/or wireless communication network, such as the Internet. In response to receiving the cookie-type data object, the external computing device may transmit to the user's computing device information about the product/service that the identifier of the product/service is associated with. This information may be an advertisement, a description, a coupon, a special discount code, a multi-media output to be generated on the user's computing device (such as a video and/or audio commercial), or any other type of information that the product/service provider wishes to distribute to users via the mechanisms of the illustrative embodiments.

In one illustrative embodiment, the communication of the cookie-type data object is performed using a near field communication mechanism, such as a Bluetooth communication connection, infrared (IR) beam communication connection, a peer-2-peer communication connection, or the like. For example, the identifier of the product/service may be placed in close proximity to a transceiver mechanism with which a transceiver in the user's computing device may communicate using a small range communication medium and protocol. Thus, when the user focuses the camera of the user's computing device on the identifier of the product/service, the user is also targeting the small range communication transceiver to communicate with the transceiver associated with the identifier of the product/service. This is especially useful with directed communication media such as infrared (IR) beams and the like.

In some illustrative embodiments, a visual indicator of the directed communication connection is shown in the display of the camera view so that the user is able to target the directed communication connection towards a particular identifier of a product/service. For example, with an IR beam enabled communication computing device, the user may see a visual representation of the IR beam in the display of the camera's detection field which allows the user to orient the IR beam such that it is directed to the identifier of the product/service that the user is interested in.

In one illustrative embodiment, the identifiers of the products/services are separate from the computing device with which the user's computing device communicates. For example, a user may detect the identifier of a product/service using the camera of the user's computing device. This provides an identifier which may be transmitted along with the user's cookie-type data object to a separate computing device which correlates the cookie-type data object with the identifier of the product/service and stores this information for later use. This cookie-type data object preferably includes, or has transmitted with it, an identifier of the user's computing device which is used to transmit back to the user's computing device the information that is associated with the identifier of the product/service.

In some illustrative embodiments, a mechanism is provided to allow a user to select an identifier of a product/service from a plurality of identifiers of products/services within a detection field of the camera of the user's computing device. Thus, the user's computing device may detect and receive identifier information from a plurality of identifiers of products/services and the user may select one or more of these for which the user wishes to obtain the corresponding product/service information. The selection may be done by selecting highlighted portions of the camera view displayed on the display of the computing device, selecting identifiers from a listing of identifiers displayed on the display of the computing device, or the like.

In some illustrative embodiments, the identifier of the product/services may be passive and may not itself perform any active communication with the user's camera enabled computing device. For example, the passive identifier may be a tag, such as a QR tag, a bar code, or the like. In some illustrative embodiments an image recognition algorithm executed in the user's camera enabled computing device may identify the identifier of the product/service from an image of the identifier or an image of the product. With passive identifiers, the identification is performed either in the user's camera enabled computing device based on an image obtained by the camera, or in an external computing device with which the user's camera enabled computing device is in communication, based on an image obtained by the camera. Thus, the identifier of the product/service need not actively transmit a communication to the user's camera enabled computing device.

In other illustrative embodiments, the identifier of the product/service may actively communicate information with the user's camera enabled communication device. For example, the user's camera enabled communication device may direct an interrogation signal towards the identifier of the product/service which may then respond to that interrogation signal with product/service information, such as an identifier value, a description, a URL, or the like. The amount of information communicated between the identifier of the product/service and the user's camera enabled computing device is preferably kept relatively small so as to facilitate quick communication and minimize the size of the computing and memory logic required to be part of the identifier of the product/service. Hence, with an active identifier of products/services, the identifier of the product/services may actively transmit information to the user's camera enabled computing device which may then be used in the manner described above and detailed hereafter.

Thus, with the mechanisms of the illustrative embodiments, a two-way information exchange is facilitated in response to a user detecting an identifier of a product/service using a camera of the user's camera enabled computing device. As a result, not only does the user obtain further information about the product/services in which they are interested, but the provider of such products/services is provided information about the users that are interested in their products/services and which products/services those users are interested in. This information may be used by the provider in many different ways including using the information for targeted marketing of products/services, emphasizing different product/service lines within the provider's business based on identified interest, providing future contact capabilities between the service/product provider and the user (such as for providing promotions, contacting the provider at a later date regarding the product, or the like), etc.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
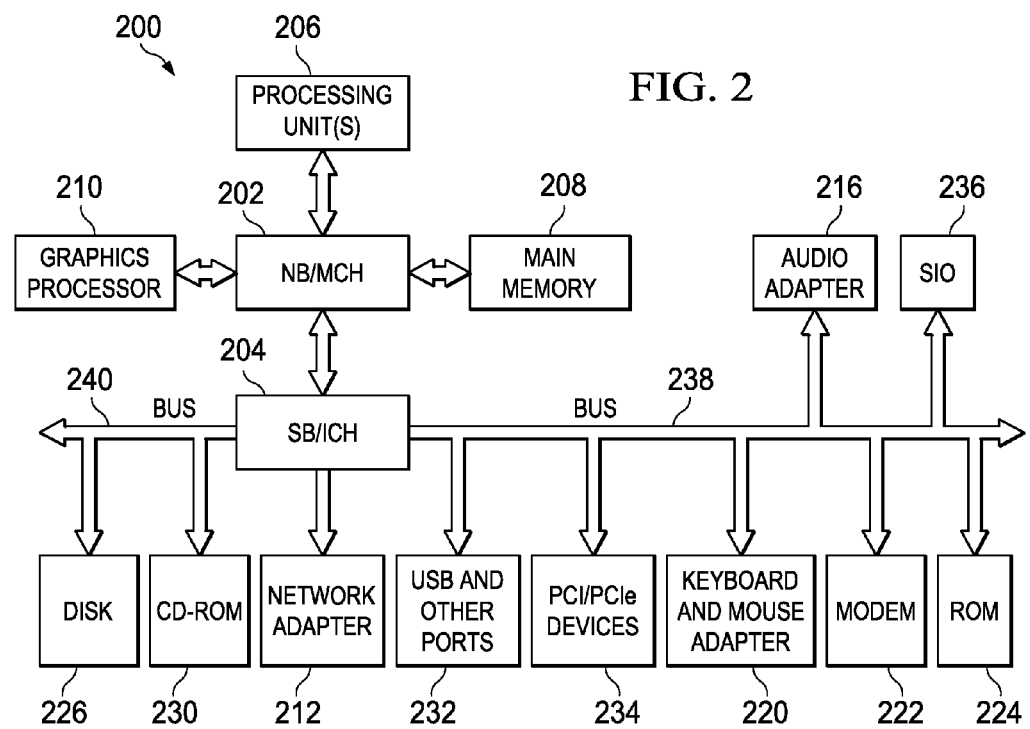
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With regard to the example distributed data processing system of FIG. 1, a user of a camera enabled computing device (not shown) may detect the presence of an identifier of a product/service and may communicate the identifier as well as a user's cookie-type data object to a computing device, such as a client 110-114, for example. The client 110-114 may be a computing device present in a store, business location, or the like. The client 110-114 may be an actual server computing device or the like which is a client to the servers 104, 106, for example. The identifier and cookie-type data object may be received in the client 110-114 and stored locally for later processing and/or transmitted to a remote server 104, 106 via one or more data networks 102. The remote server 104, 106 may host a product/service provider's content which may be used to provide information regarding products/services to users of camera enabled computing devices that request such information via the clients 110-114. In some illustrative embodiments, portions of this product/service information may be cached at the clients 110-114 for quicker response to the camera enabled computing devices. In addition, the cookie-type data object that comprises user information may be provided to the server 104, 106 for further processing by the business systems of the provider of the products/services. More details regarding the interaction of the various computing devices used with the illustrative embodiments will be provided hereafter in the following description.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The mechanisms of the illustrative embodiments may be implemented using computing systems and data processing systems as shown in FIGS. 1 and 2, or other alternative computing systems or data processing systems having different architectures and/or configurations that may be programmed or otherwise enabled to implement the operations and/or functionality of the illustrative embodiments described herein. For example, the computing device shown in FIG. 2 may be used to implement a user's camera enabled computing device, a client computing device in FIG. 1, and/or a server computing device in FIG. 1. FIGS. 1 and 2 are only examples of possible environments in which the aspects of the illustrative embodiments may be implemented.

Figure 3:
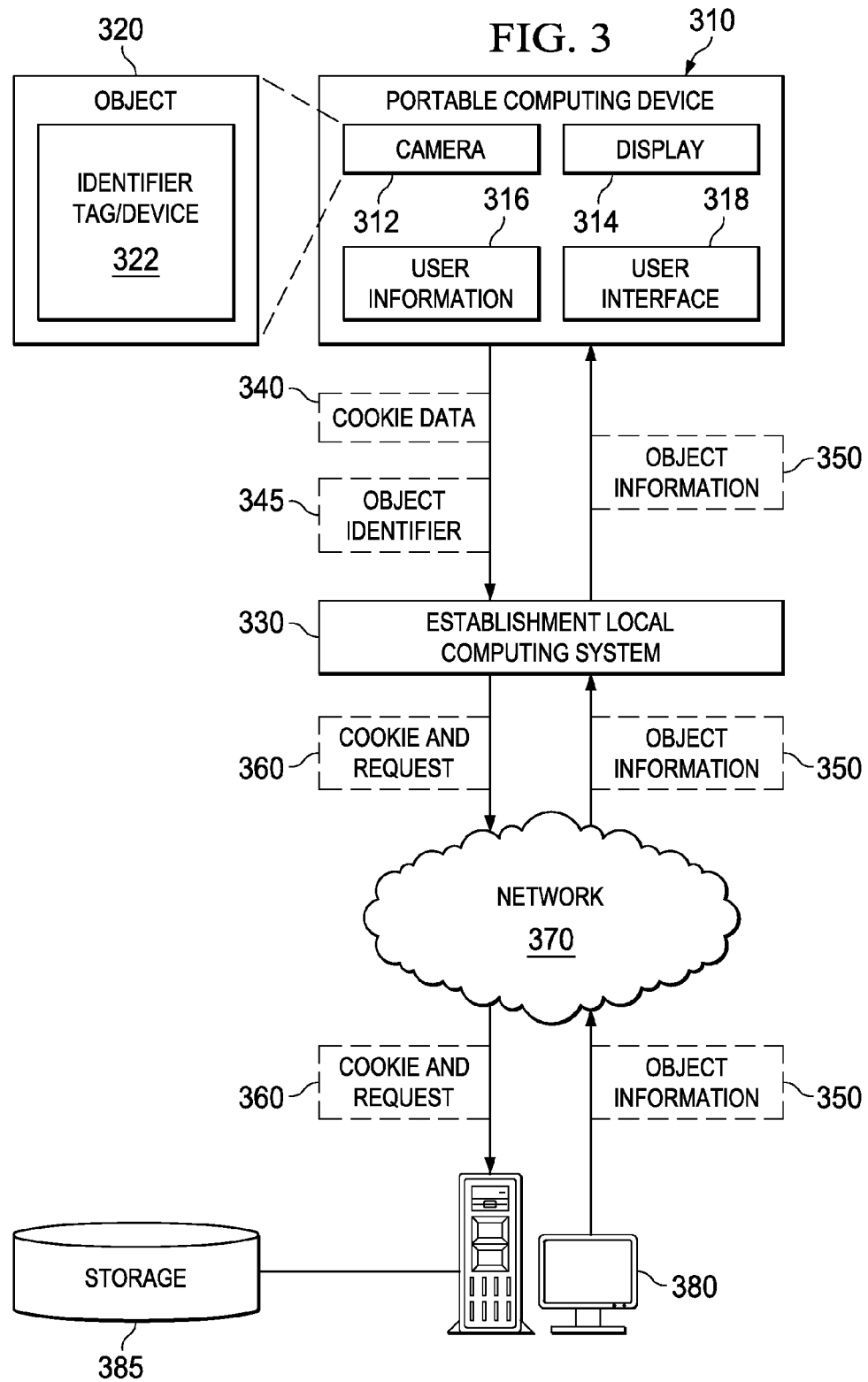
FIG. 3 is an example diagram illustrating an operation of the primary operational elements of one illustrative embodiment.

To better understand the underlying operation and principle operational elements of the illustrative embodiments, reference is now made to FIG. 3. FIG. 3 is an example diagram illustrating an operation of the primary operational elements of one illustrative embodiment. FIG. 3 is only intended to be an example and many modifications to the devices, configurations, and functionality of these operational elements may be made without departing from the spirit and scope of the illustrative embodiments.

As shown in FIG. 3, the primary operational elements of a system for two-way exchange of information using a camera based computing device comprises a portable computing device 310 having a camera 312, a display 314, a user information storage device 316, and a user input device/user interface 318. The system further comprises an object 320 configured with an identifier tag/device 322, an establishment's local computing system 330, and an object provider's server computing device 380 which may be in communication with the establishment's local computing system 330 by way of one or more data networks. It should be appreciated that, unless otherwise indicated in the following description, communication connections between these various operational elements shown in FIG. 3 may be performed using wired, wireless, or any combination of wired and/or wireless communication connections.

As shown in FIG. 3, a user of a portable computing device 310 makes use of the camera 312 provided in, or in association with, the portable computing device 310 to take a picture, scan, or otherwise obtain an image of the object 320. The portable computing device 310 may take many different forms depending upon the particular implementation chosen. For example, the portable computing device 310 may be a mobile telephone or other portable communication device, a portable computer, such as a tablet computer, personal digital assistant (PDA), laptop computer, or the like, or any other portable device that has computing hardware and/or software and is capable of performing computations based on image data obtained via a camera 312 built into or otherwise coupled to the portable computing device 310. For purposes of the present description, it will be assumed that the portable computing device 310 is a mobile telephone or tablet computer having a built-in digital camera 312, display 314 (which may be a touch panel display, LCD display, or the like) and a user input device/user interface 318, e.g., a keyboard, touch screen, or the like, for receiving user input. The user input device/user interface 318 may be integrated with the display 314 in some illustrative embodiments.

The object 320 may be any type of physical object whose image is able to be obtained using the camera 312 of the portable computing device 310. For example, the physical object 320 may be an product for sale, a sign, the packaging on a product for sale, a building, a vehicle, or the like. In one illustrative embodiment, the characteristics of the object 320 are used to perform object identification, such as by way of a visual recognition application executed on the portable computing device 310, or the like. In other illustrative embodiments, the object 320 may be associated with an identifier tag/device 322 which may be either a passive or an active identifier tag/device 322. When the camera 312 is used to obtain an image of the object 320, the image of the object may further include an image of the identifier tag/device 322 or the camera 312 may be used to specifically obtain an image of the identifier tag/device 322 itself without necessarily obtaining an image of the object 320.

With a passive identifier tag/device 322, the camera 312 obtains an image of the identifier tag/device 322 and an application executed on the portable computing device 310 may convert the image to an identifier value corresponding to the identifier tag/device 322, e.g., a URL, alphanumeric value, or the like. For example, the identifier tag/device 322 may comprise a QR tag, a bar code, an alphanumeric textual identifier, or the like, which may then be converted to an identifier corresponding to the identifier tag/device 322 which further identifies the object 320 or a service/establishment/product/etc. associated with the object 320.

With an active identifier tag/device 322, in response to a signal being transmitted from the portable computing device 310 to the identifier tag/device 322, the identifier, and possibly other information stored in the identifier tag/device 322, may be actively transmitted from the identifier tag/device 322 to the portable computing device 310. For example, when the user of the portable computing device 310 focuses the camera 312 on the object 320 and/or the identifier tag/device 322, an interrogation signal may be transmitted using a near field communication technology, e.g., infrared beam, Bluetooth, WiFi, radio frequency signal, or the like, from the portable computing device 310 to the identifier tag/device 322. In response to receiving this interrogation signal, the identifier tag/device 322 transmits a response signal back to the portable computing device 310 having the identifier data and possibly other data stored in the identifier tag/device 322, e.g., object description, URL, or the like.

Whether the identifier tag/device 322 is passive or active, the portable computing device 310 obtains an identifier value that corresponds to the identifier tag/device 322. The identifier is obtained either from the identifier tag/device 322 or through processing of the image information obtained via the camera 312 of the portable computing device 310. This identifier 345 is transmitted to an establishment local computing system 330 associated with the establishment that is local to the current location of the object 320 and its corresponding identifier tag/device 322. The identifier is transmitted along with cookie data 340 stored in the user information storage device 316 of the portable computing device 310.

The user of the portable computing device 310 selects personal user information that the user is willing to release to providers of products/services or the like, associated with detected objects 320. For example, this personal information may be selected from a user profile stored in the user information storage device 316 and may be a sub-set of the personal information stored in this user profile. The personal information may be any personal information that the user deems appropriate for exchange but may conform to a set of standardized user information that providers of products/services are interested in. The user may not provide all of the information that a provider is interested in but, as long as the user provides some of the user information that a provider is interested in, the provider may provide the service/product information requested by the user. For example, the user profile may store the user's name, address, email address, telephone number, demographic information, etc. From this set of user information, the user may select that the user's demographic information and a portion of the address, e.g., city and state, may be exchanged in order to obtain access to service/product information using the mechanisms of the illustrative embodiments, but that other user information that can be used to specifically identify the user may not be exchanged.

The sub-set of personal information for the user that is selected by the user for exchange may be packaged into a cookie-type data structure or other small sized data structure that may be stored in the storage device 316 and transmitted along with the identifier 345 to the establishment local computing system 330. Thus, in response to receiving the identifier from the identifier tag/device 322, or otherwise calculating/determining the identifier corresponding to the identifier tag/device 322 based on processing of image information obtained via the camera 312, the identifier 345 and the cookie data 340 are transmitted to the establishment local computing system 330, which may be a server computing device or the like present in the establishment where the object 320 and associated identifier tag/device 322 are located. The cookie data 340 may store information identifying the portable computing device 310. This portable computing device identification information may be used to route a response back to the portable computing device 310. This information may be stored by the establishment local computing system 330 for creating a session between the establishment local computing system 330 and the portable computing device 310.

The establishment local computing system 330 correlates the identifier 345 with stored information corresponding to the identifier 345 that identifies a provider of a service/product corresponding to the object 320. For example, the identifier 345 may be correlated with a URL or other communication identifier for communicating with a provider computing system 380, such as a server or other computing system 380 that provides information corresponding to the object 320. The establishment local computing system 330 generates a request based on the identified URL or communication identifier, the identifier 345, and the cookie data 340, and transmits the request (which includes the identifier 345) and cookie data 360 to the provider computing system 380 using the communication identifier/URL to route the request and cookie data 360 to the provider computing system 380 via the network 370.

In response to the cookie and request 360 being received by the provider computing system 380, the provider computing system 380 retrieves object information 350 corresponding to the identifier 345 in the request 360 from the storage system 385 and generates a response message with the object information 350. The response message may further comprise the portable computing device identifier 310 and other routing information from the request 360 that may be needed to route the response message back to the establishment local computing system 330 and ultimately the portable computing device 310. The response message with the object information 350 is transmitted back to the establishment local computing system 330 via the network 370 which then, based on the portable computing device identifier 310 in the response message, transmits the object information 350 to the portable computing device 310.

The portable computing device 310 may then output the object information 350 via the display 314, an audio device, or any other type of output mechanism associated with the portable computing device 310. For example, the object information 350 may comprise a graphical and/or textual content that is output via the display 314, a video or other multi-media content that may be output via a display 314, an audio device, and the like, audio data alone which may be output by the audio device, or the like. In one illustrative embodiment, the object information 350 may comprise commercials, discount codes, electronic coupons, further product/service information, web page content, or the like, which may be rendered on the portable computing device 310.

It should be appreciated that many modifications to the configuration and interactions depicted in FIG. 3 may be made without departing from the spirit and scope of the illustrative embodiments. For example, the establishment local computing system 330 may have a local storage system, cache, or the like, for storing at least a portion of the object information for objects 320 and/or associated identifier tags/devices 322 present at the establishment. In such an embodiment, rather than having to contact the provider computing system 380 for the object information 350, the object information 350 may be retrieved from the local storage system, cache, or the like, associated with the establishment local computing system 330. The establishment local computing system 330 may store the cookie data 340 for later processing and/or transmission to the provider computing system 380. Such cookie data 340 may be compiled from a plurality of portable computing devices 310 and transmitted to the provider computing system 380 as a batch. The object information stored in the local storage system, cache, or the like, may be periodically updated using a push or pull operation.

In still another illustrative embodiment, the identifier tag/device 322 may comprise a small computing device capable of communicating with the provider computing system 380 via the network 370 directly without having to go through the establishment local computing system 330. Alternatively, the identifier tag/device 322 may store the object information 350 for transmission in response to an interrogation signal from a portable computing device 310. The identifier tag/device 322 may further comprise a storage device for storing cookie data 340 and periodically transmit the compiled cookie data to the provider computing system 380.

The provider computing system 380 may perform processing of the cookie data 340 received with requests 360 which is stored in the storage system 385. This processing may take many different forms depending upon the priorities and interests of the provider with regard to users that are interested in the provider's services/products. For example, a provider may be interested in the geographical location of greatest user interest in their products/services and may process the collected cookie data 340 to determining a ranking of geographical locations based on numbers of users whose cookie data 340 is received that have geographical indicators in these various geographical locations. Processing may also be done with regard to various ones, or combinations of, demographic information from the compiled cookie data 340. Other processing of cookie data 340 may be performed without departing from the spirit and scope of the illustrative embodiments.

As an example to provide a further example context in which to understand the mechanisms of the illustrative embodiments, consider a situation in which a user enters a retail store (the establishment) and sees a pair of shoes that the user is interested in. The user may then use their mobile telephone device, which is equipped with a camera and the software/hardware of the illustrative embodiments, to take a picture of the pair of shoes and/or a tag associated with the pair of shoes (assuming a passive identifier tag/device is being used). The image of the pair of shoes and/or of the tag, e.g., a QR tag, bar code, or other type of tag, may be used within the software/hardware of the mobile telephone device to determine an identifier corresponding to the pair of shoes. The identifier is sent along with a cookie data object to the retail store's computing system which may then store the cookie data in association with the identifier of the pair of shoes, a timestamp associated with the transmission, and other information of interest to the retailer and/or provider of the pair of shoes.

If the retail store's computing system stores information about the products offered by the retailer that is to be sent to the mobile telephone device in response to receiving identifiers of products in the retailer's store, then the information stored in the retailer's computing system corresponding to the identifier of the pair of shoes is retrieved and transmitted back to the mobile telephone device. If the retail store's computing system does not store such information about the products offered, the retail store's computing system may formulate and transmit a request message with the identifier of the pair of shoes, an identifier of the retail store's computing system, an identifier of the mobile telephone device, and the cookie data, which is sent to a computer system associated with a provider of the pair of shoes. The provider's computer system may then store the cookie data, retrieve the requested product information from its storage system, and formulate and transmit a response message back to the retail store's computing system that has the requested product information. The retailer's computing system may then receive the requested product information and transmit it to the mobile telephone of the user, thereby providing more information about the pair of shoes to the user in exchange for information about the user which is received by the retailer and the provider of the pair of shoes.

As touched upon above, it may be the case that a plurality of objects 320 and/or identifier tags/devices 322 may be present within the detection field of the camera 312 of the portable computing device 310 at the same time. In such a situation, a mechanism may be provided in the portable computing device 310 for allowing the user to select which object 320 and/or identifier tag/device 322 the user is interested in. The selection mechanism may take many different forms including a touch screen display allowing a user to select a portion of an image corresponding to the object 320 and/or identifier tag/device 322, a listing of identifiers of objects 320 and/or identifier tags/devices 322 from which a user may select, or the like.

In one illustrative embodiment, all of the identifiable objects 320 and/or identifier tags/devices 322 within a detection field of the camera 312 may be highlighted on the display 314 of the portable computing device 310 such that they may be easily discernable from the remainder of the image and made selectable by the user of the portable computing device 310. Such highlighting may be performed in various ways including placing a box or other identifying structure around the object 320 or identifier tag/device 322 in the image picked up by the camera 312 and displayed on the display 314, changing a color of the object 320 or identifier tag/device 322 in the displayed image, or the like.

In one illustrative embodiment, having identified the detected objects 320 and/or identifier tags/devices 322 within a detection field of the camera 312, the user of the portable computing device 310 may select a particular object 320 and/or identifier tag/device 322 from the identified ones by using the zoom function of the camera 312 to zoom in the image on the particular object 320 and/or identifier tag/device 322 of interest. When the zoom function is utilized, the portable computing device 310 may determine when only a single detected object 320 and/or identifier tag/device 322 is present in the displayed image and thereby identify which object 320 and/or identifier tag/device 322 is of interest to the user.

Figure 4:
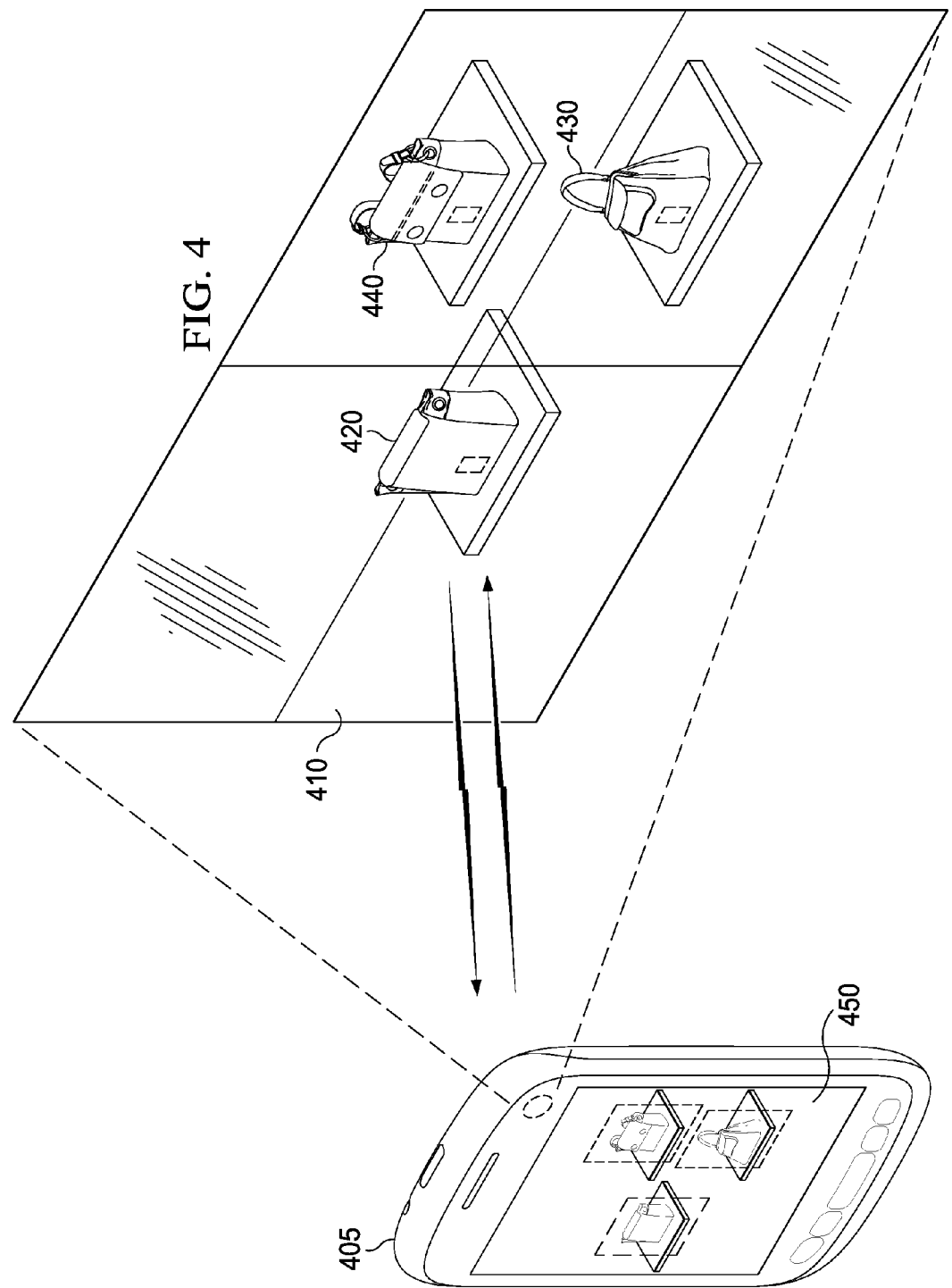
FIG. 4 is an example diagram illustrating the selection of a product from amongst a plurality of detected products in accordance with one illustrative embodiment.

FIG. 4 is an example diagram illustrating the selection of a product from amongst a plurality of detected products in accordance with one illustrative embodiment. As shown in FIG. 4, a user of a portable computing device 405 aims or focuses the detection field of the camera of the portable computing device 405 towards a window display 410 of a retail establishment. The window display 410 may comprise a plurality of objects 420-440 along with their associated identifier tags/devices (not shown). These objects 420-440 are identified by their images or by the identifiers transmitted to the portable computing device 405 by their associated identifier tags/devices and highlighted in an image on a display 450 of the portable computing device 405 with appropriate highlighting (the circles around each of the images of the objects in the display 450. A user may then select a portion of the image, such as by way of interacting with a touch screen of the display 450, to thereby select the object 420-440 of interest to the user. Thereafter, the other functions and operations described above with regard to transmitting cookie data, receiving object information, and the like, are performed in order to facilitate the two-way exchange of information between the user of the portable computing device and the retail establishment and/or provider of the selected object 420-440.

It should be appreciated that many modifications to the illustrative embodiments described above may be made. For example, in one illustrative embodiment, such as an illustrative embodiment in which active identifier tags/devices 322 are utilized with objects 320, in order to assist the user in focusing the camera 312 of the portable computing device 310 on an object 320 and its associated identifier tag/device 322 that is of interest to the user, the image displayed by the display 314 of the image picked up by the camera 312 may be further enhanced to show the path or field of the communication beam or signal transmitted by the portable computing device 310. In addition, the fields or paths of communication beams or signals transmitted by the identifier tags/devices 322 may likewise be displayed on the display 314 to further highlight these elements in the image of the display 314. The depiction of the communication beams or signals on the image of the display 314 allows the user of the portable computing device 310 to better orient the camera 312 such that the communication beam or signal is directed to the identifier tag/device 322 of interest to the user. Many other types of modifications as will become apparent to those of ordinary skill in the art in view of the present description, may be made without departing from the spirit and scope of the illustrative embodiments.

Figure 5:
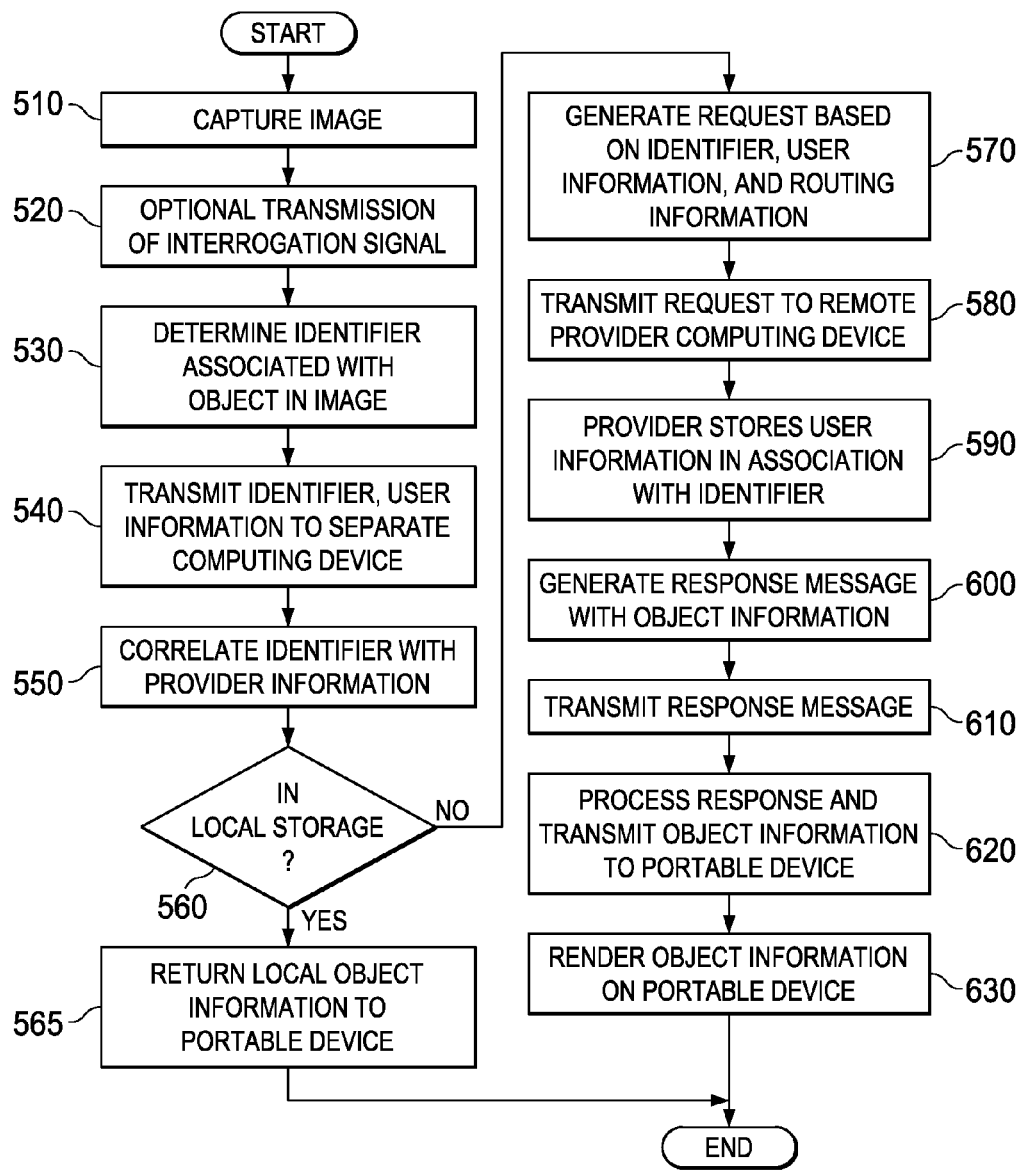
FIG. 5 is a flowchart outlining an example operation for exchanging information using a camera based device in accordance with one illustrative embodiment.

FIG. 5 is a flowchart outlining an example operation for exchanging information using a camera based device in accordance with one illustrative embodiment. As shown in FIG. 5, the operation starts by a user initiating a camera operation, on a portable computing device, to take a photograph or otherwise capturing an image of an object and/or identifier tag/device associated with the object (step 510). Optionally, the operation for capturing the image may initiate the transmission of an interrogation signal in the direction in which the camera is pointed, or broadcasting an interrogation signal in a near field area around the device housing the camera (step 520). Either from processing of the captured image by the portable computing device, or from a response message received, in the portable computing device, from the object and/or identifier tag/device associated with the object, an identifier associated with the object is generated in the portable computing device (step 530).

The identifier of the object and stored user information (such as in the form of cookie data) are transmitted by the portable computing device to a separate computing device, which may be an establishment's local computing device, for example (step 540). The separate computing device correlates the identifier of the object with provider information of a provider that provides the object or a service/product associated with the object (step 550). Optionally, the separate computing device, if configured to cache or store a local copy of object information associated with the object, determines if the object information is present in a local storage system of the separate computing device (step 560) and returns that object information to the portable computing device if the object information is present (step 565). If the object information is not present, or if the separate computing device is not configured to store a local copy of the object information, the separate computing device generates a request to be sent to a provider computing device of the identified provider, where the request comprises the user information and the identifier of the object, as well as any necessary routing information to enable routing a response message back from the provider computing device to the separate computing device and ultimately the portable computing device associated with the user (step 570).

The request is transmitted by the separate computing device to the provider computing device via one or more networks (step 580). At the provider computing device, in response to receiving the request, the user information is stored in association with the identifier of the object for further processing (step 590). In addition, the provider computing device retrieves object information corresponding to the identifier of the object and uses it to generate a response message, which also has the necessary routing information from the request message for routing the response message back to the separate computing device and ultimately the portable computing device (step 600). The provider computing device transmits the response message back to the separate computing device (step 610) which then processes the response message and transmits the object information to the portable computing device (step 620). The object information is then rendered on the portable computing device (step 630). It should be noted that the stored user information at the provider computing device may be later processed to obtain information about users' interests in products/services offered by the provider so that the provider can obtain greater insight into what products/services to provide, where to provide them, the manner by which to provide them, and the like.

Thus, the illustrative embodiments provide mechanisms for facilitating a two-way exchange of information between a user and a provider of products/services by using a camera enabled portable computing device. The illustrative embodiments improve upon known mechanisms, such as QR readers, bar code readers, and the like, in that not only does the user obtain information about the products/services, but the provider of the products/services obtains information about the user which may be of importance in assisting the provider in tailoring the types, locations, and manner by which the provider provides their products/services.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a portable computing device comprising a camera, for exchanging information between a user and a provider, comprising:

capturing an image using the camera of the portable computing device;

determining an identifier of a physical object associated with the captured image;

transmitting, by the portable computing device, the identifier of the physical object, and selected user information describing a user of the portable computing device, to a separate computing device associated with a provider of the physical object;

receiving, by the portable computing device, in response to the transmitting, physical object information associated with the physical object from the separate computing device associated with the provider of the physical object; and storing, in a storage device of the portable computing device, the physical object information in association with at least one of the captured image or the identifier of the physical object, wherein transmitting the identifier of the physical object, and selected user information to a separate computing device associated with a provider of the physical object comprises automatically sending a transmission of the selected user information to an object computing device coupled to the physical object located within a field of view upon which the camera of the portable computing device is focused in response to the capturing of the image, and wherein the object computing device transmits the identifier of the physical object and the selected user information to the separate computing device.

2. The method of claim 1, further comprising:
rendering, by one or more output devices of the portable computing device, the physical object information associated with the physical object.

3. The method of claim 1, wherein the selected user information is a preselected subset of a set of user information that the user has identified in the portable computing device as user information that the user is willing to exchange with providers of physical objects in order to obtain information about the physical objects.

4. The method of claim 3, wherein the preselected subset of user information is stored in the portable computing device as a cookie data structure, and wherein transmitting the identifier of the physical object and selected user information comprises transmitting the cookie data structure.

5. The method of claim 1, wherein transmitting the identifier of the physical object and the selected user information describing a user of the portable computing device to a separate computing device associated with a provider of the physical object comprises at least one of:
transmitting, via a wireless transmission, the identifier of the physical object and the selected user information to a premises computing device located in the premises where the physical object is physically located; or
transmitting, via a wireless transmission, the identifier of the physical object and the selected user information to a computing device coupled to the physical object.

6. The method of claim 5, wherein the wireless transmission is one of a near field communication transmission, a Bluetooth communication transmission, or an infrared (IR) beam communication transmission.

7. The method of claim 1, wherein determining an identifier of a physical object associated with the captured image comprises:
identifying a plurality of physical objects present within the captured image;
outputting, on the portable computing device, a selection interface for selecting a physical object from the plurality of physical objects for which the user wishes to receive physical object information;
receiving a selection of a selected physical object from the plurality of physical objects, via the selection interface; and
determining the identifier of the physical object associated with the captured image to be an identifier of the selected physical object from the plurality of physical objects.

8. The method of claim 7, wherein the selection interface is a displayed image on a display of the portable computing device, corresponding to the captured image, in which the plurality of physical objects are highlighted in the displayed image, and wherein receiving the section of the selected physical object comprises receiving a selection of a portion of the displayed image corresponding to one of the highlighted physical objects in the displayed image.

9. The method of claim 1, wherein capturing the image comprises capturing an image of an identifier image tag associated with the physical object having an image that uniquely identifies the physical object, a product associated with the physical object, or a service associated with the physical object.

10. The method of claim 9, wherein the identifier image tag is one of a quick response (QR) tag associated with the physical object or a bar code associated with the physical object.

11. The method of claim 1, wherein the physical object information comprises at least one of an advertisement to be output on the portable computing device, a coupon associated with a product or service associated with the physical object, or a multi-media output to be generated on the portable computing device.

12. A computer program product comprising a non-transitory computer readable medium having a computer readable program stored therein, wherein the computer readable program, when executed on a portable computing device having a camera, causes the portable computing device to:
capture an image using the camera of the portable computing device;
determine an identifier of a physical object associated with the captured image;
transmit the identifier of the physical object, and selected user information describing a user of the portable computing device, to a separate computing device associated with a provider of the physical object;
receive, in response to the transmitting, physical object information associated with the physical object from the separate computing device associated with the provider of the physical object; and
store, in a storage device of the portable computing device, the physical object information in association with at least one of the captured image or the identifier of the physical object, wherein the computer readable program causes the portable computing device to transmit the identifier of the physical object, and selected user information to a separate computing device associated with a provider of the physical object by automatically sending a transmission of the selected user information to an object computing device coupled to the physical object located within a field of view upon which the camera of the portable computing device is focused in response to the capturing of the image, and wherein the object computing device transmits the identifier of the physical object and the selected user information to the separate computing device.

13. The computer program product of claim 12, wherein the computer readable program further causes the portable computing device to:
render, by one or more output devices of the portable computing device, the physical object information associated with the physical object.

14. The computer program product of claim 12, wherein the selected user information is a preselected subset of a set of user information that the user has identified in the portable computing device as user information that the user is willing to exchange with providers of physical objects in order to obtain information about the physical objects.

15. The computer program product of claim 14, wherein the preselected subset of user information is stored in the portable computing device as a cookie data structure, and wherein transmitting the identifier of the physical object and selected user information comprises transmitting the cookie data structure.

16. The computer program product of claim 12, wherein the computer readable program causes the portable computing device to transmit the identifier of the physical object and the selected user information describing a user of the portable computing device to a separate computing device associated with a provider of the physical object by at least one of:

transmitting, via a wireless transmission, the identifier of the physical object and the selected user information to a premises computing device located in the premises where the physical object is physically located; or transmitting, via a wireless transmission, the identifier of the physical object and the selected user information to a computing device coupled to the physical object.

17. The computer program product of claim 16, wherein the wireless transmission is one of a near field communication transmission, a Bluetooth communication transmission, or an infrared (IR) beam communication transmission.

18. The computer program product of claim 12, wherein the computer readable program causes the portable computing device to determine an identifier of a physical object associated with the captured image by:

identifying a plurality of physical objects present within the captured image;

outputting, on the portable computing device, a selection interface for selecting a physical object from the plurality of physical objects for which the user wishes to receive physical object information;

receiving a selection of a selected physical object from the plurality of physical objects, via the selection interface; and determining the identifier of the physical object associated with the captured image to be an identifier of the selected physical object from the plurality of physical objects.

19. The computer program product of claim 18, wherein the selection interface is a displayed image on a display of the portable computing device, corresponding to the captured image, in which the plurality of physical objects are highlighted in the displayed image, and wherein receiving the section of the selected physical object comprises receiving a selection of a portion of the displayed image corresponding to one of the highlighted physical objects in the displayed image.

20. The computer program product of claim 12, wherein the computer readable program causes the portable computing device to capture the image by capturing an image of an identifier image tag associated with the physical object having an image that uniquely identifies the physical object, a product associated with the physical object, or a service associated with the physical object.

21. The computer program product of claim 20, wherein the identifier image tag is one of a quick response (QR) tag associated with the physical object or a bar code associated with the physical object.

22. The computer program product of claim 12, wherein the physical object information comprises at least one of an advertisement to be output on the portable computing device, a coupon associated with a product or service associated with the physical object, or a multi-media output to be generated on the portable computing device.

23. A portable computing device, comprising:

a camera;

a processor coupled to the camera;

a storage device coupled to the processor; and a memory coupled to the processor, wherein the memory comprises instructions which, when executed by the processor, cause the processor to:

capture an image using the camera of the portable computing device;

determine an identifier of a physical object associated with the captured image;

transmit the identifier of the physical object, and selected user information describing a user of the portable computing device, to a separate computing device associated with a provider of the physical object;

receive, in response to the transmitting, physical object information associated with the physical object from the separate computing device associated with the provider of the physical object; and store, in the storage device of the portable computing device, the physical object information in association with at least one of the captured image or the identifier of the physical object, wherein the instructions cause the processor to transmit the identifier of the physical object, and selected user information to a separate computing device associated with a provider of the physical object by automatically sending a transmission of the selected user information to an object computing device coupled to the physical object located within a field of view upon which the camera of the portable computing device is focused in response to the capturing of the image, and wherein the object computing device transmits the identifier of the physical object and the selected user information to the separate computing device.

* * * * *